(12) United States Patent
Gernstein

(10) Patent No.: US 6,554,348 B1
(45) Date of Patent: Apr. 29, 2003

(54) BUS BODY

(76) Inventor: Dan H. Gernstein, 16572 Hascall St., Omaha, NE (US) 68130

( * ) Notice: Subject to any disclaimer, the term of this patent is extended or adjusted under 35 U.S.C. 154(b) by 0 days.

(21) Appl. No.: 10/162,789

(22) Filed: Jun. 4, 2002

(51) Int. Cl.[7] .......................... B62D 31/02; B60R 27/00
(52) U.S. Cl. ....................... 296/178; 296/191; 296/39.1
(58) Field of Search ................................ 296/178, 181, 296/188, 191, 201, 202, 39.1

(56) References Cited

U.S. PATENT DOCUMENTS

| | | | | |
|---|---|---|---|---|
| 5,042,395 A | * | 8/1991 | Wackerle et al. | 105/397 |
| 5,306,068 A | * | 4/1994 | Nakae et al. | 296/189 |
| 5,362,345 A | * | 11/1994 | Stettler et al. | 156/173 |
| 5,433,151 A | * | 7/1995 | Ohara et al. | 105/397 |
| 5,685,229 A | * | 11/1997 | Ohara et al. | 105/397 |
| 5,849,122 A | * | 12/1998 | Kenmochi et al. | 156/182 |
| 6,065,261 A | * | 5/2000 | Fehr et al. | 52/580 |
| 6,079,768 A | * | 6/2000 | Kalina | 296/178 |
| 6,117,520 A | * | 9/2000 | Wielinga et al. | 428/116 |
| 6,164,716 A | * | 12/2000 | Palazzolo et al. | 296/188 |
| 6,375,249 B1 | * | 4/2002 | Stanton et al. | 296/178 |
| 6,413,613 B1 | * | 7/2002 | Byma | 428/116 |

OTHER PUBLICATIONS

Nida Core "About Us" website printed Nov. 7, 2002.*
Nida–Core Corporation brochure regarding Polypropylene Honeycomb: The New Heart and Core of Composites, undated.
Nida–Core "flyer" entitled "Light . . .Tough . . . Quiet", undated.
Misc. pages from the Nida–Core web site regarding "Superior Honeycomb Composite Materials," printed May 4, 2002.
Document entitled "Core Material Comparisons" prepared by Intermarine Yachting and dated Jan. 30, 1998.
Brochure entitled "Nida–Core Info", vol. 1.1, undated.

* cited by examiner

Primary Examiner—D. Glenn Dayoan
Assistant Examiner—Patricia L. Engle
(74) Attorney, Agent, or Firm—Thomte, Mazour & Niebergall; Dennis L. Thomte

(57) ABSTRACT

A bus body comprising opposite side walls, a rear wall and a roof including inner and outer fiberglass wall members which define a space therebetween. The space between the inner and outer wall members is filled with a polypropylene honeycomb material. In a modified version of the bus body, the polypropylene honeycomb material is only positioned between the inner and outer wall members in those areas which may be subjected to moisture.

34 Claims, 4 Drawing Sheets

BUS BODY

BACKGROUND OF THE INVENTION

1. Field of the Invention

This invention relates to bus or van (hereafter "bus") bodies and more particularly to those bodies which utilize honeycomb material in the side walls, rear wall and roof for strengthening purposes. Even more particularly, the invention relates to the use of polypropylene honeycomb material in the body of the bus which is moisture resistant.

2. Description of the Related Art

Buses are commonly used as shuttle buses to transport people to and from airports, hotels, car rental agencies, etc. The side walls, rear wall and roof of the shuttle bus is frequently comprised of inner and outer fiberglass wall members which define a space therebetween which is filled with a paper honeycomb material for strengthening purposes.

The bus body normally has windows and/or doors formed in the sides of the body and in the rear wall of the body. Further, the roof of the bus sometimes has a selectively closeable ventilation and/or escape opening formed therein. Further, an air conditioning unit is sometimes mounted on the roof of the bus. Frequently, the seals between those windows, doors, openings and air conditioning units and the outer walls is imperfect which results in moisture coming into contact with the paper honeycomb material in the space between the inner and outer walls which causes a deterioration of the paper honeycomb material thereby necessitating costly repair or replacement of the same. Additionally, the side walls of the bus body normally have wheel openings or cutouts formed in the lower end thereof. Water from the roadway is splashed upwardly into the wheel openings and may come into contact with the paper honeycomb material in the side walls of the body which causes a deterioration of the material as described above.

SUMMARY OF THE INVENTION

A bus body comprising opposite side walls, a rear wall and a roof. Each of the side walls, rear wall and roof are comprised of inner and outer fiberglass wall members which are spaced-apart to define a space therebetween which is filled with a polypropylene honeycomb material such as sold under the trademark "Nida-Core" by Nida-Core Corporation, 541 NW Interpark Place, Port St. Lucie, Fla. 34986. The polypropylene honeycomb material, as opposed to paper honeycomb material, does not deteriorate or delaminate when exposed to water such as may occur around windows, doors, vent openings, escape openings, air conditioning units or wheel openings. Although polypropylene material is preferred, polyethylene material could also be used, as well as other plastic materials. Polypropylene honeycomb material is more expensive than paper polypropylene material so in some instances, the polypropylene honeycomb material is only used around those areas which are likely to be exposed to moisture with the remainder of the honeycomb material being comprised of a paper or a paper-based material.

A principal object of the invention is to provide a bus body which incorporates a plastic honeycomb material such as polypropylene in the side walls, rear wall and roof of the bus body.

A principal object of the invention is to provide a bus body which incorporates polypropylene honeycomb material in the side walls, rear wall and roof of the bus body which eliminates possible deterioration of the honeycomb material if subjected to moisture.

A further object of the invention is to provide a bus body wherein polypropylene honeycomb material is substituted for the paper honeycomb material in those areas of the bus which are likely to be exposed to moisture.

These and other objects will be obvious to those skilled in the art.

DESCRIPTION OF THE PREFERRED EMBODIMENT

Figure 1:
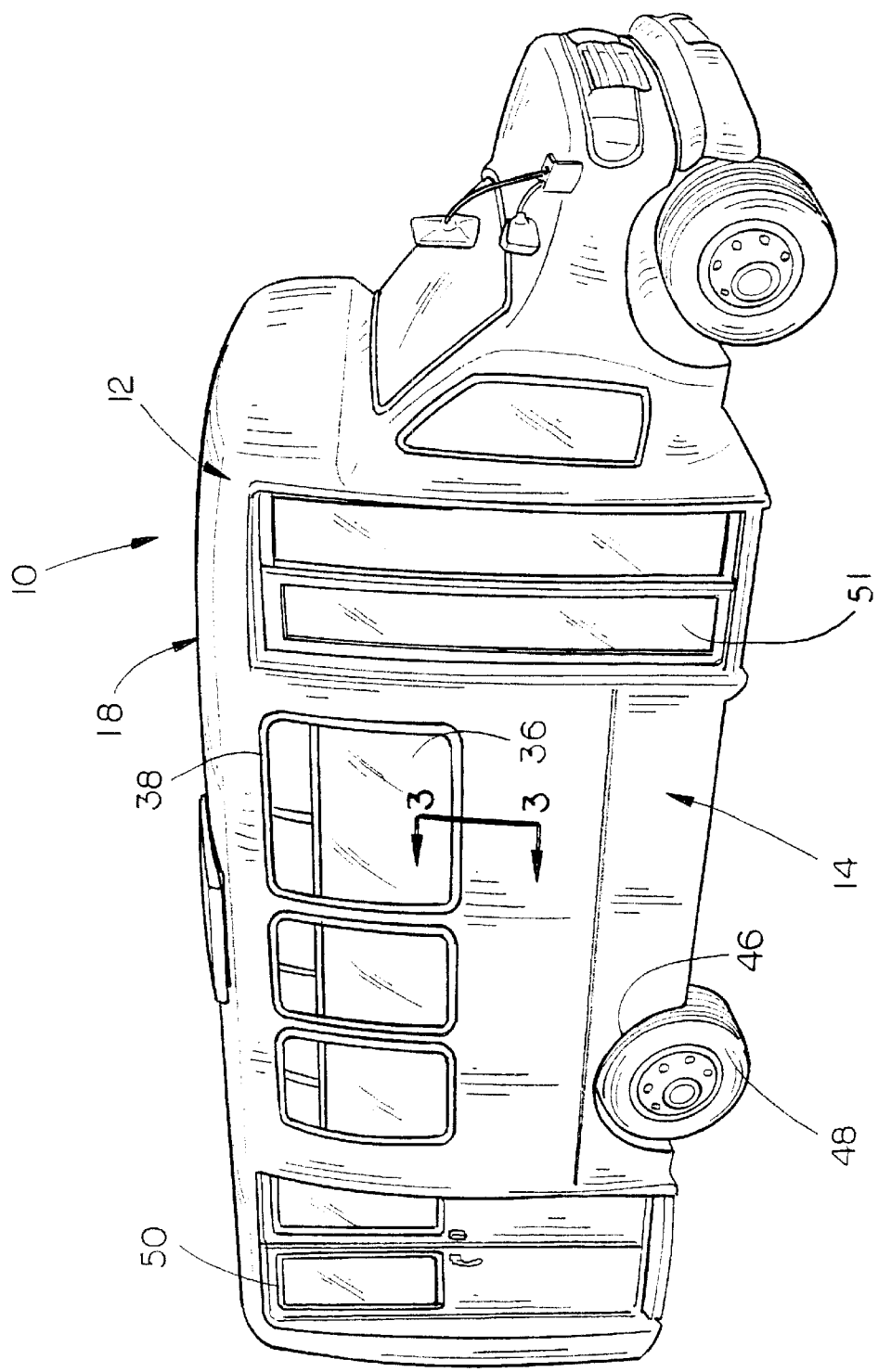
FIG. 1 is a perspective view of a shuttle bus.
Figure 2:
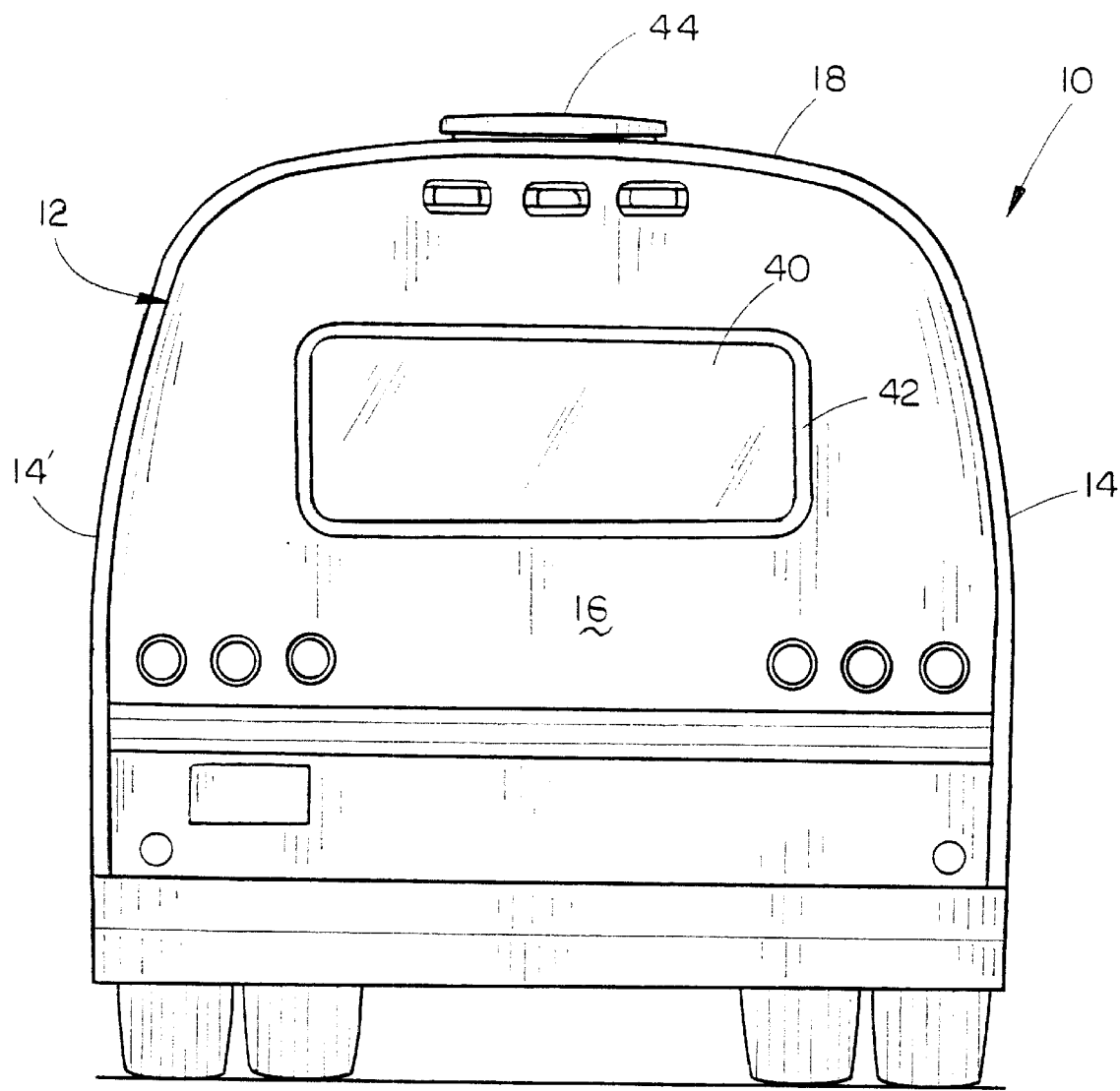
FIG. 2 is a rear view of the shuttle bus.
Figure 4:
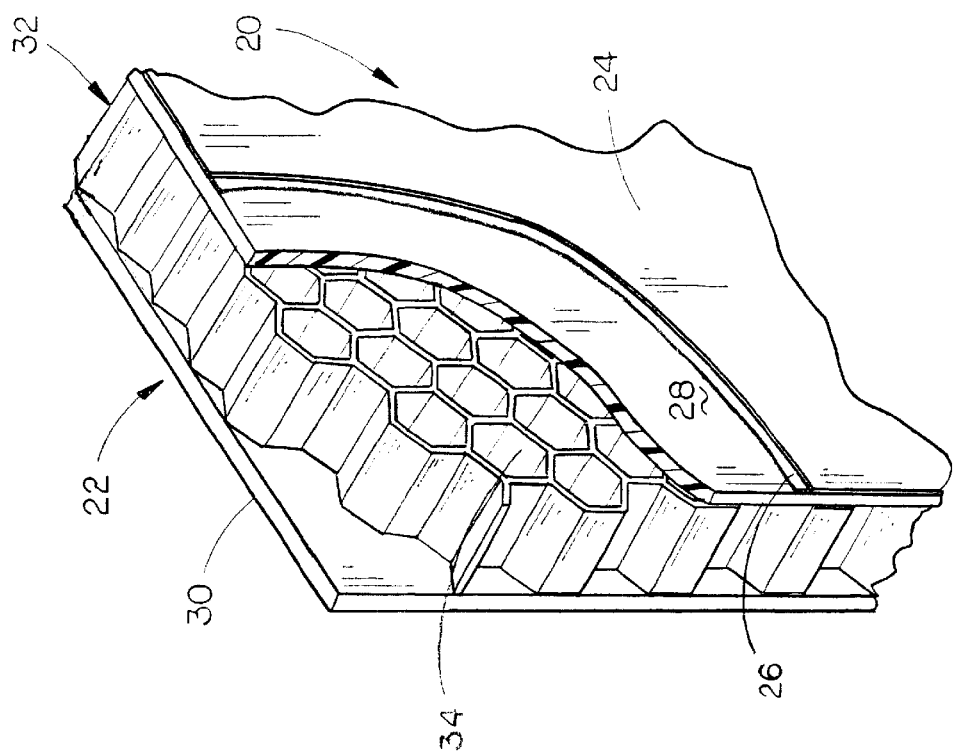
FIG. 4 is a partial perspective view of a wall of the bus with portions thereof cut away to more fully illustrate the invention.
Figure 3:
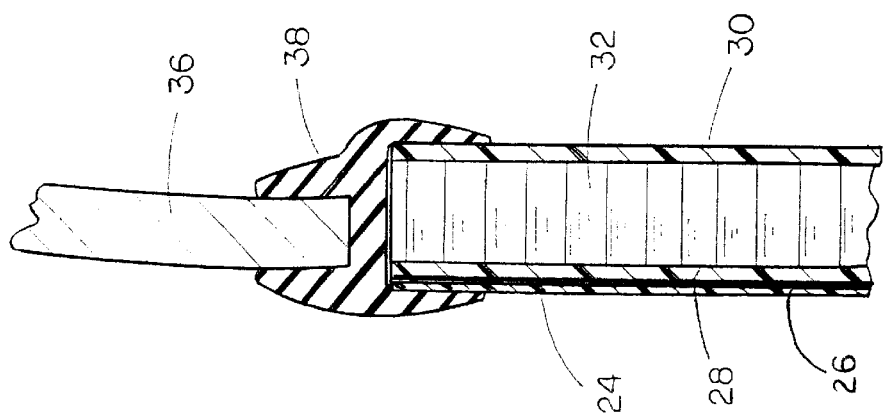
FIG. 3 is a sectional view as seen on lines 3—3 of FIG. 1.

Referring to the drawings, the numeral 10 designates a bus used to transport people to and from airports, hotels, car rental agencies, etc. For purposes of description, bus 10 will be described as comprising a body 12 including opposite side walls 14 and 14', rear wall 16, and roof 18.

Side wall 14 includes outer wall member 20 and inner wall member 22 which are spaced-apart to define a space therebetween. Outer wall member 20 is comprised of a gel coat 24, skin coat resin 26 and press coat resin 28. Skin coat resin 26 is positioned between gel coat 24 and press coat resin 28. Inner wall member 22 is comprised of a back coat resin 30. The space between wall members 20 and 22 is filled with a plastic honeycomb material 32 such as polypropylene. The preferred polypropylene honeycomb material 32 is sold under the trademark "Nida-Core" by Nida-Core Corporation, 541 N.W. Interpark Place, Port St. Lucie, Fla. 34986.

The honeycomb material 32 comprises a plurality of cells 34 which provide the strength for the material. The inner and outer sides of honeycomb material 32 are bonded to the press coat resin 28 and the back coat resin 30, respectively. The polypropylene honeycomb material 32 is impervious to moisture and will not deteriorate or delaminate if subjected to moisture as will the conventional paper honeycomb material normally used in between the inner and outer fiberglass walls in the sides, rear and roof of the bus. The side wall 14', rear wall 16 and roof 18 also comprise spaced-apart inner and outer wall members identical to that described with respect to side wall 14.

Bus 10 normally has windows 36 in the side walls thereof which have seals 38 extending therearound. Normally, bus 10 also has a window 40 provided in rear wall 16 which has a seal 42 extending therearound. In some buses, a luggage door is provided in the rear wall. Frequently, an escape opening or vent opening is formed in roof 18 which is selectively closed by a cover 44. Further, an air conditional unit is sometimes mounted on the roof 18 of the bus or in some other location. Additionally, the sides of the bus normally have wheel openings or cutouts 46 formed therein to accommodate the rear wheels 48 of the bus 10. Some buses also have a rear entry door 50 provided therein for wheelchairs in addition to a front side entry door 51.

If the seals around the windows, openings, cutouts, doors or air conditioner unit should leak, the honeycomb material between the inner and outer walls of the body will deteriorate or delaminate if the honeycomb material is comprised of a paper material. By substituting the polypropylene honeycomb material, deterioration and delamination of the honeycomb material is prevented.

Figure 5:
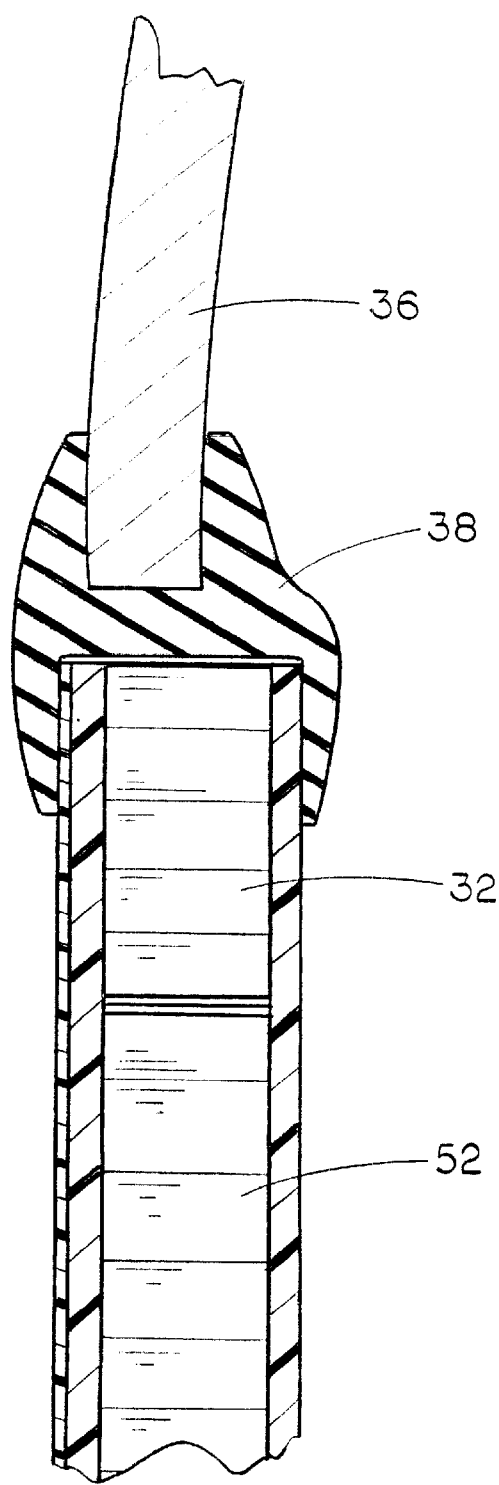
FIG. 5 is a sectional view similar to FIG. 3 but which illustrates the structure wherein polypropylene honeycomb material is used in those areas likely to be subjected to moisture with the remaining areas being filled with a paper-based honeycomb material.

The polypropylene honeycomb material is more expensive than the paper honeycomb material. Thus, the use of polypropylene honeycomb material throughout the bus will result in additional expense. Therefore, when cost is a consideration, it is recommended that the polypropylene honeycomb material be used only in those areas which will possibly be exposed to moisture. For example, the polypropylene honeycomb material 32 could be positioned around the windows, openings, cutouts, doors, etc., and the remaining space between the inner and outer walls could be filled with the less expensive paper honeycomb material 52, a seen in FIG. 5. As an example, the polypropylene honeycomb material 32 could extend outwardly for 10–20 inches from the windows, openings, cutouts, doors, etc., with the paper honeycomb material 52 being used in the remaining space.

Thus, it can be seen that the invention accomplishes at least all of its stated objectives.

I claim:

1. A bus body, comprising:
   a wheeled frame having a forward end and a rearward end;
   a body mounted on said wheeled frame for transporting passengers therein;
   said body including a roof, opposite side walls, and a rear wall;
   each of said side walls comprising an outer wall member and an inner wall spaced from said outer wall member to define a space therebetween;
   each of said walls having at least one window mounted therein;
   said space between said inner and outer wall members being filled with a honeycomb material;
   said honeycomb material around said windows comprising a plastic material;
   said plastic honeycomb material comprising polypropylene;
   said honeycomb material, other than said polypropylene honeycomb material, being comprised of a paper honeycomb material.

2. A bus body, comprising:
   a wheeled frame having a forward end and a rearward end;
   a body mounted on said wheeled frame for transporting passengers therein;
   said body including a roof, opposite side walls, and a rear wall;
   each of said side walls comprising an outer wall member and an inner wall spaced from said outer wall member to define a space therebetween;
   each of said walls having at least one window mounted therein;
   said space between said inner and outer wall members being filled with a honeycomb material;
   each of said side walls have lower edges having wheel openings extending upwardly thereinto;
   said honeycomb material around said wheel openings comprising a plastic material;
   said plastic honeycomb material comprising polypropylene;
   said honeycomb material, other than said polypropylene honeycomb material around said wheel openings, being comprised of a paper honeycomb material.

3. A bus body, comprising:
   a wheeled frame having a forward end and a rearward end;
   a body mounted on said wheeled frame for transporting passengers therein;
   said body including a roof, opposite side walls, and a rear wall;
   said rear wall comprising inner and outer rear wall members defining a space therebetween;
   said rear wall of said body having a rear window mounted therein;
   said space between said inner and outer rear wall members being filled with a honeycomb material;
   said honeycomb material in said space between said inner and outer rear wall members around said rear window being comprised of a plastic material;
   said plastic honeycomb material comprising polypropylene;
   said honeycomb material, other than said polypropylene honeycomb material around said rear window, being comprised of a paper honeycomb material.

4. A bus body, comprising:
   a wheeled frame having a forward end and a rearward end;
   a body mounted on said wheeled frame for transporting passengers therein;
   said body including a roof, opposite side walls, and a rear wall;
   said roof comprising inner and outer roof members defining a space therebetween;
   said roof having a selectively closable opening formed therein;
   said space between said inner and outer roof members being filled with a honeycomb material;
   said honeycomb material in said space around said closable opening comprising a plastic honeycomb material;
   said plastic honeycomb material comprising polypropylene;
   said honeycomb material, other than said polypropylene honeycomb material, being comprised of a paper honeycomb material.

5. A bus body, comprising:
   a wheeled frame having a forward end and a rearward end;
   a body mounted on said wheeled frame for transporting passengers therein;
   said body including a roof, opposite side walls, and a rear wall;
   each of said side walls comprising an outer wall member and an inner wall spaced from said outer wall member to define a space therebetween;
   each of said walls having at least one window mounted therein;
   said space between said inner and outer wall members being filled with at least a first and second honeycomb material;

said first and second honeycomb materials having different material compositions.

6. The bus body of claim 5 wherein said first and second honeycomb materials are non-absorbent.

7. The bus body of claim 5 wherein said first honeycomb structure comprises a plastic material.

8. The bus body of claim 7 wherein said first honeycomb structure further comprises polypropylene.

9. The bus body of claim 8 wherein said polypropylene material is laminated to said inner and outer wall members.

10. The bus body of claim 8 wherein said first honeycomb structure is extruded to form cells.

11. The bus body of claim 10 wherein said cells are closed cells.

12. The bus body of claim 11 wherein said second honeycomb member is comprised of paper material.

13. The bus body of claim 12 wherein said first honeycomb material is around said window.

14. The bus body of claim 12 wherein said side walls have lower edges having wheel openings extending upwardly thereinto; said first honeycomb material is around said wheel openings.

15. A bus body, comprising:
a wheeled frame having a forward end and a rearward end;
a body mounted on said wheeled frame for transporting passengers therein;
said body including a roof, opposite side walls, and a rear wall;
said rear wall comprising inner and outer rear wall members defining a space therebetween;
said rear wall of said body having a rear window mounted therein;
said space between said inner and outer rear wall members being filled with at least a first and second honeycomb material;
said first and second honeycomb material having different material compositions.

16. The bus body of claim 15 wherein said first and second honeycomb materials are non-absorbent.

17. The bus body of claim 15 wherein said first honeycomb structure comprises a plastic material.

18. The bus body of claim 17 wherein said first honeycomb structure further comprises polypropylene.

19. The bus body of claim 18 wherein said polypropylene material is laminated to said inner and outer rear wall members.

20. The bus body of claim 18 wherein said first honeycomb structure is extruded to form cells.

21. The bus body of claim 20 wherein said cells are closed cells.

22. The bus body of claim 21 wherein said second honeycomb member is comprised of paper material.

23. The bus body of claim 22 wherein said first honeycomb material is around said rear window.

24. The bus body of claim 22 wherein said rear wall has a luggage door mounted therein; said first honeycomb material is around said luggage door.

25. The bus body of claim 22 wherein said rear wall has a door provided therein; said first honeycomb material is around said door.

26. A bus body, comprising:
a wheeled frame having a forward end and a rearward end;
a body mounted on said wheeled frame for transporting passengers therein;
said body including a roof, opposite side walls, and a rear wall;
said roof comprising inner and outer roof members defining a space therebetween;
said roof having a selectively closable opening formed therein;
said space between said inner and outer roof members being filled with at least a first and second honeycomb material;
said first and second honeycomb material having different material compositions.

27. The bus body of claim 26 wherein said first and second honeycomb materials are non-absorbent.

28. The bus body of claim 26 wherein said first honeycomb structure comprises a plastic material.

29. The bus body of claim 28 wherein said first honeycomb structure further comprises polypropylene.

30. The bus body of claim 29 wherein said polypropylene material is laminated to said inner and outer roof members.

31. The bus body of claim 29 wherein said first honeycomb structure is extruded to form cells.

32. The bus body of claim 31 wherein said cells are closed cells.

33. The bus body of claim 32 wherein said second honeycomb member is comprised of paper material.

34. The bus body of claim 33 wherein said first honeycomb structure material is around said closable opening.

\* \* \* \* \*